(12) United States Patent
Jadidian et al.

(10) Patent No.: US 12,024,476 B2
(45) Date of Patent: Jul. 2, 2024

(54) CARBON-CARBON COMPOSITE INCLUDING ANTIOXIDANT COATING

(71) Applicant: Honeywell International Inc., Morris Plains, NJ (US)

(72) Inventors: Bahram Jadidian, Watchung, NJ (US); Richard George Rateick, Jr., South Bend, IN (US); Mehrad Mehr, Raleigh, NC (US); Donald Olson, Dover, NJ (US)

(73) Assignee: Honeywell International Inc., Charlotte, NC (US)

( * ) Notice: Subject to any disclaimer, the term of this patent is extended or adjusted under 35 U.S.C. 154(b) by 316 days.

(21) Appl. No.: 16/797,610

(22) Filed: Feb. 21, 2020

(65) Prior Publication Data

US 2021/0261474 A1 Aug. 26, 2021

(51) Int. Cl.
*B32B 9/00* (2006.01)
*C04B 35/83* (2006.01)
(Continued)

(52) U.S. Cl.
CPC .......... *C04B 41/5024* (2013.01); *C04B 35/83* (2013.01); *C04B 41/009* (2013.01);
(Continued)

(58) Field of Classification Search
CPC .............................. Y10T 428/30; B82Y 30/00
(Continued)

(56) References Cited

U.S. PATENT DOCUMENTS 3,692,150 A * 9/1972 Ruppe, Jr. ............. F16D 65/126
428/408
4,837,073 A 6/1989 Mcallister et al.
(Continued)

FOREIGN PATENT DOCUMENTS

CN 101613209 A 12/2009
CN 103044086 A 4/2013
(Continued)

OTHER PUBLICATIONS

Response to Extended Search Report dated Jun. 28, 2021, from counterpart European Application No. 21155085.0, filed Jul. 30, 2021, 39 pp.
(Continued)

*Primary Examiner* — Daniel H Miller
(74) *Attorney, Agent, or Firm* — Shumaker & Sieffert, P.A.

(57) ABSTRACT

An article including carbon-carbon composite substrate may be treated with an antioxidant coating prior to use in an oxidizing environment. The antioxidant coating may be configured to reduce oxidation at an external surface of the C—C composition and reduce ingress of oxidants into pores or other open passages defined by the C—C composite substrate to avoid internal oxidation. An example article includes a C—C composite substrate, a bond coat, and an antioxidant coating. The C—C composite substrate defines a friction surface and a non-friction surface. The bond coat is disposed on the non-friction surface. The antioxidant coating may be disposed on at least a portion of the bond coat. The antioxidant coating may include ytterbium disilicate and a sintering aid.

20 Claims, 2 Drawing Sheets

(51) Int. Cl.
    *C04B 41/00*         (2006.01)
    *C04B 41/45*         (2006.01)
    *C04B 41/50*         (2006.01)
    *C04B 41/52*         (2006.01)
    *C04B 41/89*         (2006.01)
    *F16D 65/12*         (2006.01)
    *F16D 69/02*         (2006.01)
    *B82Y 30/00*         (2011.01)

(52) U.S. Cl.
    CPC ...... *C04B 41/4515* (2013.01); *C04B 41/4539* (2013.01); *C04B 41/5059* (2013.01); *C04B 41/5061* (2013.01); *C04B 41/52* (2013.01); *C04B 41/89* (2013.01); *F16D 65/125* (2013.01); *F16D 69/023* (2013.01); *B82Y 30/00* (2013.01); *C04B 2235/66* (2013.01); *C04B 2235/9607* (2013.01); *C04B 2235/9684* (2013.01); *Y10T 428/30* (2015.01)

(58) Field of Classification Search
    USPC .......................................................... 428/408
    See application file for complete search history.

(56) References Cited

U.S. PATENT DOCUMENTS

| | | | |
|---|---|---|---|
| 6,555,173 | B1 | 4/2003 | Forsythe et al. |
| 6,668,984 | B2 | 12/2003 | Gray |
| 7,160,618 | B2 | 1/2007 | Walker et al. |
| 7,501,181 | B2 | 3/2009 | Walker et al. |
| 9,714,578 | B2 | 7/2017 | Kirby |
| 2006/0057289 | A1 | 3/2006 | Simpson et al. |
| 2011/0027470 | A1 | 2/2011 | Kirby et al. |
| 2014/0037969 | A1* | 2/2014 | Margolies ............ C23C 4/18 427/446 |
| 2016/0145158 | A1 | 5/2016 | Ogasawara et al. |
| 2016/0312628 | A1 | 10/2016 | Kirby |
| 2016/0333955 | A1 | 11/2016 | Rowe et al. |

FOREIGN PATENT DOCUMENTS

| | | |
|---|---|---|
| CN | 105814007 A | 7/2016 |
| CN | 105948775 A | 9/2016 |
| CN | 106966762 A | 7/2017 |
| CN | 107915499 A | 4/2018 |
| CN | 109053207 A | 12/2018 |

OTHER PUBLICATIONS

Latzel et al., "New Environmental Barrier Coating System on Carbon-Fiber Reinforced Silicon Carbide Composites," Journal of Thermal Spray Technology, vol. 14, No. 2, Jun. 2005, 5 pp.

Pourasad et al., "Oxidation resistance of a SiC-ZrB2 coating prepared by a novel pack cementation on SiC-coated graphite," Journal of Materials Science, vol. 52, Oct. 4, 2016, 8 pp.

Li et al., "Research on the Oxidation-Protective Coatings for Carbon/Carbon Composites," Carbon Science, vol. 6, No. 2, Jun. 2005, 8 pp.

Aparicio et al., "Yttrium Silicate Coatings for Oxidation Protection of Carbon-Silicon Carbide Composites," Journal of the American Ceramic Society, vol. 83, No. 6, Nov. 11, 1999, 5 pp.

Zhang et al., "New insights into the early stages of thermal oxidation of carbon/carbon composites using electrochemical methods," ScienceDirect, Carbon, Issue 108, Jul. 9, 2016, 13 pp.

Guo et al., "An Yb2Si2O7 Oxidation Resistance Coating for C/C Composites by Supersonic Plasma Spray," The American Ceramic Society, Advanced Ceramic Coatings and Materials for Extreme Environments, ICACC 2011, vol. 32, No. 3, (Applicant points out, in accordance with MPEP 609.04(a), that the year of publication, 2011, is sufficiently earlier than the effective U.S. filing date, so that the particular month of publication is not in issue.), pp. 85-90.

Extended Search Report from counterpart European Application No. 21155085.0, dated Jun. 28, 2021, 9 pp.

Office Action, and translation thereof, from counterpart Chinese Application No. 202110129207.9 dated Apr. 19, 2023, 17 pp.

Response to Communication pursuant to Article 94(3) EPC dated Sep. 11, 2023, from counterpart European Application No. 21155085.0 filed Jan. 8, 2024, 14 pp.

Decision of Rejection, and translation thereof, from counterpart Chinese Application No. 202110129207.9 dated Oct. 19, 2023, 8 pp.

Communication pursuant to Article 94(3) EPC from counterpart European Application No. 21155085.0 dated Sep. 11, 2023, 4 pp.

\* cited by examiner

CARBON-CARBON COMPOSITE INCLUDING ANTIOXIDANT COATING

TECHNICAL FIELD

The disclosure relates to carbon-carbon composite materials, such as aircraft brake discs made of carbon-carbon composite materials.

BACKGROUND

Carbon-carbon (C—C) composites can be used in many high temperature applications. For example, the aerospace industry employs C—C composite components as friction materials for commercial and military aircraft, such as brake friction materials. In some examples, such as high temperature applications, C—C composites may be susceptible to oxidation and deterioration of physio-mechanical properties.

SUMMARY

A carbon-carbon composite substrate may be treated with an antioxidant coating prior to use in an oxidizing environment. In some examples, the antioxidant coating may be configured to reduce oxidation at an external surface of the C—C composition and reduce ingress of oxidants into pores or other open passages defined by the C—C composite substrate to avoid internal oxidation.

In some examples, the disclosure relates to an article including a C—C composite substrate, a bond coat, and an antioxidant coating. The C—C composite substrate defines a friction surface and a non-friction surface. The bond coat is disposed on the non-friction surface. The antioxidant coating disposed on at least a portion of the bond coat. The antioxidant coating includes ytterbium disilicate and a sintering aid.

In some examples, the disclosure relates to a method that includes forming, on a non-friction surface of a carbon-carbon composite substrate, a bond coat. The method also includes forming, on at least a portion of the bond coat, an antioxidant coating that includes ytterbium disilicate and a sintering aid.

In some examples, the disclosure relates to a C—C composite brake disc including a C—C composite substrate, a bond coat, and an antioxidant coating. The C—C composite substrate defines a friction surface and a non-friction surface. The bond coat is disposed on the non-friction surface. The antioxidant coating disposed on at least a portion of the bond coat. The antioxidant coating includes ytterbium disilicate and a sintering aid.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes articles and techniques of forming articles than include a carbon-carbon composite substrate, a bond coat, and an antioxidant coating. The bond coat may be disposed on a non-friction surface of the carbon-carbon composite substrate, e.g., a surface that is not subject to friction wear during operation of the article. The antioxidant coating may be disposed on at least a portion of the bond coat. The antioxidant coating may include a base-material and a sintering aid. The antioxidant coating may be configured to adhere to the bond coat, to remain thermally stable at temperatures greater than about 1650 degrees Fahrenheit (° F.) (1000 degrees Celsius (° C.)) and/or up to at least 3000° F. (1645° C.), to have a coefficient of thermal expansion (CTE) that is similar to a CTE of the bond coat and/or the C—C composite substrate, or combinations thereof.

Figure 1:
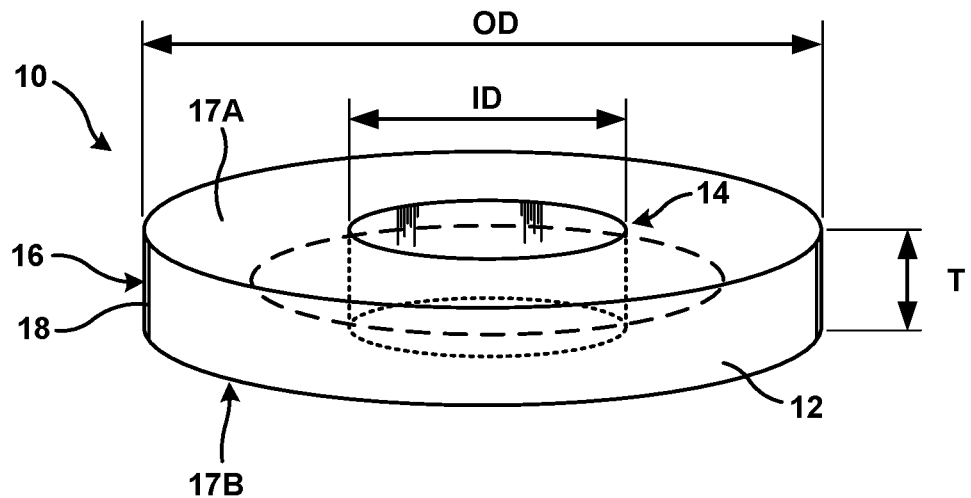
FIG. 1 is a perspective view of an example carbon-carbon composite that includes an antioxidant coating including at least one metal oxide.

FIG. 1 is a perspective view of an example article 10 that may include a bond coat (not shown) and an antioxidant coating 18 on an underlying carbon-carbon composite substrate 12. In some examples, articles 10 includes a brake disc, such as a rotor or stator of a braking mechanism of an aircraft. In other examples, article 10 may define other mechanical components that operate in oxidative environments at temperatures that may exceed about 2,500° F. (1,371° C.), such as temperatures that may exceed 3000° F. (1,649° C.). In the example of FIG. 1, article 10 includes antioxidant coating 18 on outer circumferential surface 16. In examples in which article 10 includes a brake disc, outer circumferential surface 16 may defines a non-friction surface. Annular surfaces 17A and/or 17B may define friction surfaces of article 10.

Substrate 12 may include carbon-based reinforcement fibers and a carbon-based matrix material at least partially surrounding the carbon-based reinforcement fibers. In some examples, substrate 12 may be formed from a porous preform that includes carbon fibers or carbon-precursor fibers. Examples of porous preforms that may be used to produce substrate 12 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms. In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers.

In other examples, the porous preform may not include predefined layers, but, rather, may be formed from a bundle of fibers that are mechanically bound together, e.g., via needling. In other examples, a combination of any of the aforementioned types of porous preforms can be used.

In some examples, the porous preform may be formed using carbon fibers. In other examples, the porous preform may be formed using a carbon fiber precursor material, such as polyacrylonitrile (PAN) fibers, which are subsequently pyrolyzed to form carbon fibers. In some examples, the porous preform may include isotropic carbon or a precursor material that converts to isotropic carbon when pyrolyzed. For example, PAN may convert to isotropic carbon when pyrolyzed.

Substrate 12 also may include a matrix material that at least partially encapsulates the carbon fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like. Examples of densifying agents that may be used in an RTM, VPI, or PIC process include, but are not limited to, liquid resin or pitches (e.g., isotropic and/or mesophase pitches) that provide a relatively high carbon yield, e.g., of greater than about 80%, and may have a relatively high viscosity, such as synthetic mesophase pitches, coal-tar derived pitches, such as thermally or chemically treated coal tar, petroleum-derived pitches, synthetic-pitch derivatives, thermally treated pitches, catalytically converted pitches, and thermoset or thermoplastic resins, such as phenolic resins. In some examples, the carbon-carbon composite preform may be subjected to a sufficient number of densification steps to result in a density between about 1.5 grams per cubic centimeter (g/cm$^3$) and about 1.85 g/cm$^3$ or higher.

In some examples of RTM, the carbon-carbon composite preform is placed into a mold matching the desired part geometry. A relatively low viscosity thermoset resin may be injected at low temperature (50° C. to 150° C.) using pressure or induced under vacuum, into the porous carbon-carbon composite preform contained within a mold. The resin is cured within the mold before being removed from the mold.

In one example of an RTM process, the densifying agent, such as a resin or pitch, may be rapidly injected into a mold enclosing the porous preform, e.g., within between about 10 seconds and about 40 seconds, such as about between about 15 seconds and about 40 seconds, using an injection apparatus. In one example, the injection apparatus may comprise a heater extruder that melts a densifying agent feedstock, such as resin pellets, and feeds the liquid densifying agent to an accumulator. An injector, such as a piston, may drive the liquid densifying agent into the mold at a relatively high pressure and at a relatively high velocity. Further description of an example injection apparatus and method of using the apparatus is described in the commonly-assigned U.S. Pat. Nos. 6,537,470 and 7,172,408, the entire contents of which are incorporated herein by reference.

In some examples of VPI, the carbon-carbon composite preform is heated under inert conditions to well above the melting point of the impregnating pitch. Then, gas in the pores of the carbon-carbon composite preform is removed by evacuating the preform. Finally, molten pitch is allowed to infiltrate the pores of the preform, as the overall pressure is returned to one atmosphere or above. In the VPI process, a volume of resin or pitch is melted in one vessel while the porous carbon-carbon composite preform is contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches may provide lower carbon yields than mesophase pitches.

After injecting the densifying agent into the porous preform, the densifying agent may be pyrolyzed to remove any non-carbon containing elements, which may convert the densifying agent infiltrated within the porous preform into a carbon-carbon composite. In one example, where a synthetic mesophase pitch is used, the pitch may be pyrolyzed using hot isostatic pressurization (HIP). In another example, the densifying agent may be stabilized by heating the densifying agent infiltrated in the porous preform in an oxygen-containing environment to a temperature below the softening point of the densifying agent. The oxygen may react with the densifying agent to provide for cross-linking within the densifying agent. Once a suitable amount of oxygen has been absorbed and/or reacted into the densifying pitch, the porous preform may be heated to pyrolysis temperatures without melting the densifying agent or exuding any of the densifying agent from the porous preform.

When the densifying agent is pyrolyzed, the densifying agent may form anisotropic carbon. Although the densifying agent may be a solvent-to-high yielding carbon precursor, the resulting anisotropic carbon may still have some porosity. In some examples, the porosity may depend on the type of densifying agent, e.g., the type of carbon or resin. In some examples, at least some of the pores of the anisotropic carbon are open, e.g., in which at least some of the adjacent pores are connected.

In some examples, additional densification steps may be performed after any RTM, VPI, or PIC densification steps to achieve a final density for article 10. For example, a liquid densifying agent with a relatively low viscosity, such as a furfuryl alcohol may be infiltrated into pores remaining in the densified preform to at least partially fill the remaining pores. As another example, one or more cycles of CVD/CVI may be performed to at least partially fill the remaining pores in the densified preform.

In some examples, as shown in FIG. 1, article 10 may have a generally disc-shaped geometry, e.g., for use as a brake disc. Article 10 includes a carbon-carbon composite substrate 12 with a central bore 14 extending through an axial thickness T of carbon-carbon composite substrate 12. In some examples, carbon-carbon composite substrate 12 has an inner diameter ID at bore 14, an outer diameter OD at an outer circumferential surface 16, and an axial thickness T, which is a distance between annular surfaces 17A and 17B measured in a direction substantially orthogonal to the direction in which inner diameter ID and outer diameter OD are measured. In other examples, article 10 may define a different geometry.

Article 10 includes antioxidant coating 18 on outer circumferential surface 16 of carbon-carbon composite substrate 12. Constituents of antioxidant coating 18 include a base-material and, in some examples, a sintering aid. In some examples, antioxidant coating 18 may include only a base-material. In some examples, antioxidant coating 18 may include more than one base-material, such as two or three different base-materials. In some examples, antioxidant coating 18 may include one or more sintering aids, such as two or three different sintering aids. The base-material may include, for example, at least one of a high temperature refractory material, refractory metal silicate, one or more lanthanide disilicates, ytterbium monosilicate, ytterbium disilicate, yttrium monosilicate, yttrium disilicate, aluminum titanate, lutetium disilicate, erbium disilicate, scandium disilicate, holmium disilicate, mullite, silicon carbide, or silicon nitride. In some example, the base material of antioxidant coating 18 may be ytterbium disilicate alone or in combination with another base material. In some examples, antioxidant coating 18 may consist of ytterbium disilicate and a sintering aid. In some examples, antioxidant coating 18 may consist essentially of ytterbium disilicate and a sintering aid.

In some examples, antioxidant coating 18 including ytterbium disilicate may have a stable crystalline phase up to a melting point of antioxidant coating 18. Phase transformation associated with heating and/or cooling of antioxidant coatings without a stable crystalline phase up to a melting point of the antioxidant coating may result in expansion and contraction of the antioxidant coating which consequently results in cracking and/or spallation.

In some examples, antioxidant coating 18 including ytterbium disilicate may have a low coefficient or thermal expansion (CTE) compared to antioxidant coatings that do not include ytterbium disilicate. The low CTE may, in some examples, a low CTE mismatch relative to a CTE of carbon-carbon composite substrate 12 and/or a CTE of bond coat 20. During operation, antioxidant coatings having a high CTE mismatch relative to a carbon-carbon composite substrate or bond coat may results in cracking and spallation of the antioxidant coating.

In some examples, antioxidant coating 18 including ytterbium disilicate may have a high melting point compared to antioxidant coatings that do not include ytterbium disilicate. The relatively high melting point may enable antioxidant coating 18 to be used in applications that require resistance against high temperatures up to about 3000° F.

In some examples, a weight percent (wt. %) of the base-material may be within a range from about 90 wt. % to about 99.9 wt. %, such as about 94 wt. % to about 99 wt. % or about 94 wt. % to about 98 wt. %, of the antioxidant coating composition. In some examples, the base-material may be greater than about 90 wt. % of the antioxidant coating composition. By including greater than about 90 wt. % base-material, additional antioxidant coating constituents (e.g., a sintering aid) may have a negligible effect on selected physical properties of antioxidant coating 18, such as a coefficient of thermal expansion (CTE) of antioxidant coating 18.

The sintering aid may include any suitable material configured to improve, relative to the base-material without the sintering aid, a change in free energy from the decrease in surface area of particle of the antioxidant coating constituents and lowering of the surface free energy by the replacement of solid-vapor interfaces with lower-energy solid-solid interfaces thereby reducing porosity. In some examples, the sintering aid may include a material configured to form a eutectic composition with the base-material. In some examples, the sintering aid may include aluminum oxide, mullite, cordierite, lantanium silicate, lithium silicate, cobalt silicate, barium strontium silicate, barium silicate, strontium silicate, titanium oxide, tectosilicates (potassium feldspar (K-spar) endmember $KAlSi_3O_8$, albite endmember $NaAlSi_3O_8$, and anorthite endmember $CaAl2Si_2O_8$), plagioclase feldspars, barium feldspars (celsian $BaAl_2Si_2O_8$, and hyalophane $(K,Ba)(Al,Si)_4O_8$). In some examples, a weight percent (wt. %) of the sintering aid may be within a range from about 0.1 wt. % to about 6 wt. %, such as about 1 wt. % to about 6 wt. % or about 2 wt. % to about 6 wt. %, of the antioxidant coating composition. In some examples, the sintering aid may be less than about 10 wt. % of the antioxidant coating composition. By including less than about 10 wt. % sintering aid, the sintering aid may have a negligible effect on selected physical properties of antioxidant coating 18, such as a coefficient of thermal expansion (CTE) of antioxidant coating 18. In examples in which an operating temperature of article 10 is less than about 2500° F., the sintering aid may be less than about 35 wt. % of the antioxidant coating composition, the balance (e.g., greater than about 65 wt. %) being the base material as discussed above.

In some examples, the composition of the antioxidant coating may be selected to be densified through liquid phase sintering mechanisms. For example, liquid phase sintering mechanisms may include bonding a majority of base material particles through a liquid (glass) phase that covers a surface of the base material particles. In this way, antioxidant coating 18 may include a composite made of base material particles in a glass matrix. In some examples, densification of the composition of the antioxidant coating may also include a solid state sintering mechanism. For example, an amount of liquid provided by a selected sintering aid (e.g., alumina or the like) may not cover a surface of every base material particle. In examples in which the base material includes ytterbium disilicate (94 wt. %-98 wt. %) and the sintering aid includes alumina (2 wt. %-6 wt. %), the composition may sinters through both liquid state mechanisms and solid state mechanisms.

In some examples, article 10 may be subjected to high temperatures during use. For example, carbon-carbon composite brake discs may be subject to temperatures as high as about 1,000° C. during braking events. In some examples, carbon-carbon composite brake discs may be subject to temperatures as high as about 1,650° C. (3,000° F.) during braking events. Hence, in some examples, the base-material and/or the sintering aid of antioxidant coating 18 may be stable at temperatures of up to about 1,650° C. In this context, "stable" may mean at least one of does not degrade into its constituent elements, does not react with carbon, or does not react with other elements or compounds present in the environment in which antioxidant coating 18 is used.

In some examples, the standard free energy of formation of the constituents of antioxidant coating 18 (e.g., the high temperature refractory material and/or the sintering aid) may be less than the standard free energy of formation of decomposition products of the constituent, such as, for example, carbon monoxide, at all temperatures below about 1,650° C.

In some examples, antioxidant coating 18 may be stable at higher temperatures relative to, for example, phosphate-based coatings, such as aluminum phosphate-based coatings. Some phosphate-based coatings may be stable up to about 1650° F., above which phosphorus pentoxide loss may degrade the oxidation protection over time and/or result in structural changes to the remaining phosphate-based coating. In some examples, antioxidant coating 18 may be stable up to about 3000° F. (1645° C.) and/or have a melting point greater than about 3300° F. (1816° C.).

Antioxidant coating 18 may have any suitable thickness. In some examples, antioxidant coating 18 may have a thickness within a range from about 90 microns to about 100 microns. In some examples, a thickens of antioxidant coating 18 may be less than 90 microns, such as within a range from about 10 microns to about 90 microns. In some examples, a thickens of antioxidant coating 18 may be greater than 100 microns, such as within a range from about 100 microns to about 500 microns.

Figure 2:
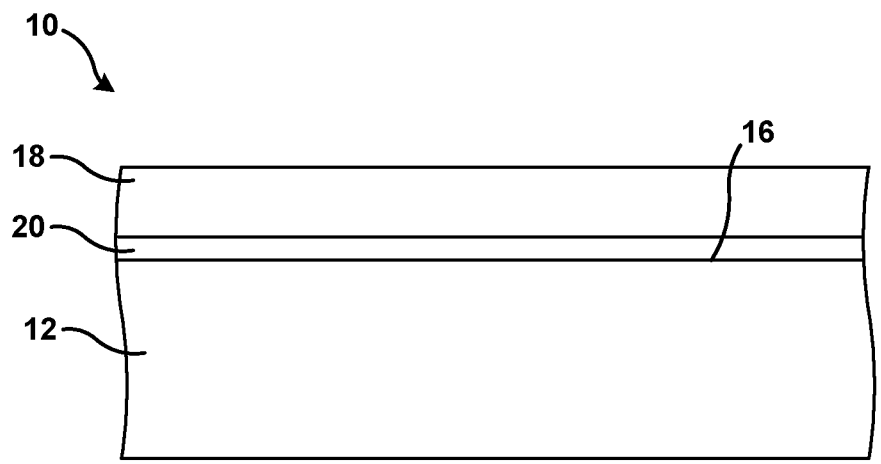
FIG. 2 is a conceptual and schematic cross-sectional of an example carbon-carbon composite that includes an antioxidant coating and a sub-surface region including an antioxidant.

Article 10 additionally includes a bond coat (e.g., bond layer). FIG. 2 is a conceptual and schematic cross-sectional of article 10 illustrating C—C composite substrate 12, antioxidant coating 18, and an example bond coat 20. Bond coat 20 is disposed directly on outer circumferential surface 16 of carbon-carbon composite substrate 12. Bond coat 20 may include, for example, a silicon-based coating, such as a silicon carbide coating, another carbide-based coating, such as titanium carbide; or any other suitable bond coat configured to improve adhesion of antioxidant coating 18 to C—C composite substrate 12 compared to the adhesion of antioxidant coating 18 to C—C composite substrate 12 absent bond coat 20.

Bond coat 20 may have any suitable thickness. In some examples, bond coat 20 may have a thickness within a range from about 10 microns to about 100 microns. In some examples, a thickens of bond coat 20 may be less than 10 microns. In some examples, a thickens of bond coat 20 may be greater than 100 microns, such as within a range from about 100 microns to about 500 microns.

In examples in which bond coat 20 includes a silicon carbide coating, bond coat 20 maybe formed by in-situ reaction between silicon and carbon of C—C composite substrate 12. For example, silicon may be sprayed onto a surface of C—C composite substrate 12 and heat treated in vacuum at about 2,642° F. (1450° C.) as described in commonly-assigned U.S. Pat. No. 6,555,173 to Forsythe et al., the entire contents of which is incorporate herein by reference.

In some examples, antioxidant coating 18 may have a coefficient of thermal expansion (CTE) that is similar to a CTE of bond coat 20 and/or the C—C composite substrate 12. By similar, the CTE of antioxidant coating 18, bond coat 20, and/or the C—C composite substrate 12 may be within a threshold value sufficient to substantially prevent (e.g., within common tolerances of coating manufacturing) delamination, spallation, and/or cracking of antioxidant coating 18 during normal operations of article 10. In some examples, C—C composite substrate 12 may have an axial CTE within a range from about 1.5 parts per million per degree Celsius (ppm/° C.) to about 3.3 ppm/° C. In some examples, antioxidant coating 18 may have a CTE within a range from about 3 ppm/° C. to about 4.5 ppm/° C., such as within a range from about 3.5 ppm/° C. to about 4.5 ppm/° C. In some examples, bond coat 20 may have a CTE within a range from about 1.5 ppm/° C. to about 4.5 ppm/° C. By having a CTE that is similar to the CTE of the bond coat and/or the C—C composite substrate, the antioxidant coating may resist delamination, spallation, and/or crack development when subjected to thermal cycling, such as during normal operations of an article including the C—C composite substrate 12. Resisting delamination, spallation, and/or cracking may increase the usable life of article 10 by at least, for example, reducing oxygen ingress to the C—C composite substrate 12.

Figure 3:
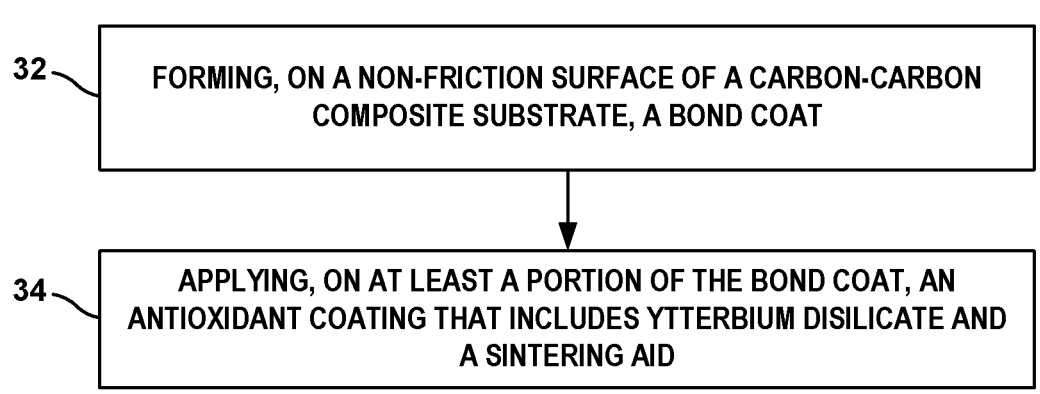
FIG. 3 is diagram illustrating an example technique for forming a carbon-carbon composite that includes an antioxidant coating including at least one metal oxide.

FIG. 3 is diagram illustrating an example technique for forming an article including a C—C composite substrate, a bond coat formed on the C—C composite, and an antioxidant coating applied to the bond coat. The technique of FIG. 3 is described with respect to article 10 discussed above in reference to FIGS. 1 and 2, however, the technique may be used to form other articles and other technique may be used to form article 10. Additionally, FIG. 3 is described with respect to antioxidant coating 18 including a base-material including ytterbium disilicate and a sintering aid, although in other example, antioxidant coating 18 may include anyone or more of the base-materials as described above.

In some examples, the technique illustrated in FIG. 3 optionally may include forming C—C composite 12 by preform densification processes as described above. After densifying C—C composite 12, the technique may include forming bond coat 20 and, subsequently, antioxidant coating 18.

The technique illustrated in FIG. 3 includes forming, on a non-friction surface 16 of C—C composite substrate 12, bond coat 20 (32). In examples in which bond coat 20 includes silicon carbide, forming bond coat 20 may include applying (e.g., painting, spraying, or the like) a silicon containing material to surface 16 of C—C composite substrate 12. The silicon containing material may include, for example, silicon metal (Si); Si and silicon carbide (SiC); Si, SiC, and alumina; Si, SiC, and molybdenum disilicide ($MoSi_2$); Si and $MoSi_2$; Si and tantalum disilicate ($TaSi_2$); Si and titanium disilicate ($TiSi_2$); or Si and a combination of one or more disilicides described herein. Forming bond coat 20 also may include heating the silicon containing material and C—C composite substrate 12 in a vacuum to form silicon carbide bond coat 20 by in-situ reaction between silicon of a silicon containing material and carbon of C—C composite substrate 12. In some examples, heating the silicon containing material and C—C composite substrate 12, may include heating the silicon containing material and C—C composite substrate 12 in a vacuum to about 2,642° F. (1450° C.).

Similar techniques may be used to form other bond coats, such as a titanium carbide (TC) bond coat. For example, a TiC bond coat may include titanium (Ti) metal plus SiC and disilicides can be used. However, their processing temperature is higher than 1450 C. it is near the melting point of titanium (1660 C).

The technique illustrated in FIG. 3 also includes applying, on at least a portion of the bond coat, an antioxidant coating that includes ytterbium disilicate and a sintering aid (34). In some examples, applying the antioxidant coating (34) may include forming an antioxidant coating paint and applying the paint to C—C composite substrate 12. For example, the technique may include blending constituents of antioxidant coating 18, e.g., a base-material, such as ytterbium disilicate, and a sintering aid, such as aluminum oxide, mullite, or cordierite, to form an antioxidant coating powder. Blending, in some example, may include blending using a ball mill or any other suitable technique utilized in ceramic processing and optionally sieving the resulting antioxidant coating powder.

The technique also may include mixing the antioxidant coating powder with any suitable solvent (e.g., a binder and thinner) to form an antioxidant coating paste. The antioxidant coating paste may have a high solid loading. In some examples, a high solids loading may be greater than about 80 wt. % solids. The technique also may include mixing the antioxidant coating paste with the same or different solvent to form an antioxidant coating paint. The antioxidant coating paint may include a suitable rheology for brush painting, spray painting, or dip coating onto the surface of a C—C composite substrate. The technique also includes at least one of brushing, spraying, or dip coating C—C composite substrate 12 with antioxidant coating 18 paint.

After painting the C—C composite substrate 12 with antioxidant coating 18 composition, the technique may include heating the antioxidant coating composition to evaporate substantially all of the solvent and form a dried antioxidant coating composite. For example, heating C—C composite substrate 12 and the antioxidant coating composition may include drying in an oven at about 170° C. for a suitable duration.

After drying the antioxidant coating composition, the technique may include heating the dried antioxidant coating composite to remove any residual solvent or organic constituent of the antioxidant coating to form a green antioxidant coating composite. For example, heating the dried antioxidant coating composite may include heating C—C composite substrate 12 and the dried antioxidant coating in an oven at about 350° C. for a suitable duration. In some examples, heating the dried antioxidant coating composite may include heating C—C composite substrate 12 and the dried antioxidant coating in an oven at about 400° C. for a suitable duration.

After heating the dried antioxidant coating composite, the technique may include densifying the green antioxidant coating composite to form the antioxidant coating 12. In some examples, densifying the green antioxidant coating composite may include, for example, vacuum sintering, low pressure sintering, hot isostatic pressing (HIP), atmospheric pressure sintering under inert gas, or modified spark plasma sintering. For example, densification may include sintering at about 1485° C. to about 1550° C. for about 20 to about 120 minutes which include temperatures that are lower than those required for pack cementation.

In some examples, heating steps, such as densification, may be accompanied by sintering shrinkage which leads to microscopic mud cracking. To achieve desired thickness and also fill in mud cracks, the coating process may be repeated.

The techniques described herein may include advantages compared to other techniques, such as, for example, pack cementation process in which ceramic coating is formed by embedding a C—C composite substrate in a reactive powder and heating the ceramic powder. However, coating only selected surfaces, e.g., non-friction surfaces of a brake disc, may be difficult using pack cementation technique, thereby, requiring post-processing steps such as grinding excess coating from friction surfaces, which may be time consuming and add costs.

Additionally, or alternatively, the deposition techniques described herein may include advantages compared to other technique that require cracking of a ceramic barrier coating and to enable a phosphate-based antioxidant coating to penetration into the cracks. As discussed above, however, phosphate-based coatings may have limited temperature capability due to phosphorous pentoxide volatilization.

Various examples have been described. These and other examples are within the scope of the following claims.

What is claimed is:

1. A brake assembly comprising:
a carbon-carbon composite brake disc comprising:
a carbon-carbon composite substrate defining a friction surface and a non-friction surface, wherein the non-friction surface of the carbon-carbon composite substrate is not subject to friction wear during a braking operation of the brake assembly, and wherein the friction surface of the carbon-carbon composite substrate is subject to friction wear during the braking operation of the brake assembly;
a bond coat disposed on the non-friction surface; and
an antioxidant coating disposed on at least a portion of the bond coat on the non-friction surface, wherein the antioxidant coating comprises ytterbium disilicate and a sintering aid, and wherein the antioxidant coating defines an outermost surface of the carbon-carbon composite brake disc at the non-friction surface; and
a rotor, wherein the carbon-carbon composite brake disc defines a stator, wherein the rotor and the stator are configured to frictionally engage during the braking operation of the aircraft brake assembly such that the friction surface of the carbon composite substrate is subject to the friction wear during the braking operation and the non-friction surface is not subject to the friction wear during the braking operation, and wherein the antioxidant coating is configured to reduce oxidation of the carbon-carbon composite substrate in an oxidizing environment.

2. The assembly of claim 1, wherein a weight percent of ytterbium disilicate is within a range from about 94 weight percent (wt. %) to about 99.9 wt. %, and wherein a weight percent of the sintering aid is within a range from about 0.1 wt. % to about 6 wt. % of the antioxidant coating.

3. The assembly of claim 1, wherein the sintering aid is selected from the group consisting of aluminum oxide, mullite, cordierite, and combinations thereof.

4. The assembly of claim 1, wherein a coefficient of thermal expansion of the antioxidant coating is within a range from about 3.5 parts per million per degree Celsius (ppm/C) to about 4.5 ppm/° C.

5. The assembly of claim 1, wherein the bond coat comprises silicon carbide.

6. The assembly of claim 1, wherein the bond coat comprises titanium carbide.

7. The assembly of claim 1, wherein the antioxidant coating is stable at temperatures up to at least about 3000° F. (1645° C.).

8. A carbon-carbon composite brake disc comprising:
a carbon-carbon composite substrate defining an annular disc shape, wherein the annular disc shape includes an outer circumferential surface extending between a first annular surface and a second annular surface of the annular disc shape, wherein the outer circumferential surface defines a non-friction surface of the brake disc and at least one of the first annular surface or the second annular surface define a friction surface of the brake disc;
a bond coat disposed on the outer circumferential surface; and
an antioxidant coating disposed on at least a portion of the bond coat on the outer circumferential surface, wherein the antioxidant coating comprises ytterbium disilicate and a sintering aid, wherein the antioxidant coating defines an outermost surface of the carbon-carbon composite substrate at the non-friction surface, and wherein the antioxidant coating is configured to reduce oxidation of the carbon-carbon composite substrate in an oxidizing environment.

9. The carbon-carbon composite brake disc of claim 8, wherein the sintering aid is selected from the group consisting of aluminum oxide, mullite, cordierite, and combinations thereof.

10. The carbon-carbon composite brake disc of claim 8, wherein the sintering aid is within a range from about 0.1 weight percent (wt. %) to about 6 wt. % of the antioxidant coating.

11. The carbon-carbon composite brake disc of claim 8, wherein a coefficient of thermal expansion of the antioxidant coating is within a range from about 3.5 parts per million per degree Celsius (ppm/C) to about 4.5 ppm/° C.

12. A brake assembly comprising:
a carbon-carbon composite brake disc comprising:
a carbon-carbon composite substrate defining a friction surface and a non-friction surface, wherein the non-friction is not subject to friction wear during a braking operation of the brake assembly, and wherein the friction surface is subject to friction wear during the braking operation of the brake assembly;
a bond layer disposed on the non-friction surface; and
an antioxidant coating disposed on at least a portion of the bond layer on the non-friction surface, wherein the antioxidant coating comprises ytterbium disilicate and a sintering aid, and wherein the antioxidant coating defines an outermost surface of the carbon-carbon composite brake disc at the non-friction surface; and
a stator, wherein the carbon-carbon composite brake disc defines a rotor, wherein the rotor and the stator are configured to frictionally engage during the braking operation of the aircraft brake assembly such that the friction surface of the carbon composite substrate is subject to the friction wear during the braking operation and the non-friction surface is not subject to the friction wear during the braking operation, and wherein the antioxidant coating is configured to reduce oxidation of the carbon-carbon composite substrate in an oxidizing environment.

13. The assembly of claim 1, wherein the bond coat is directly on the carbon-carbon composite substrate and the antioxidant coating is directly on the bond coat.

14. The assembly of claim 13, wherein the bond coat comprises titanium carbide.

15. The carbon-carbon composite brake disc of claim 8, wherein the bond coat is directly on the carbon-carbon composite substrate and the antioxidant coating is directly on the bond coat.

16. The assembly of claim 1, wherein the antioxidant coating includes only a single layer.

17. The assembly of claim 12, wherein the antioxidant coating includes only a single layer.

18. The assembly of claim 12, wherein the bond coat is directly on the carbon-carbon composite substrate and the antioxidant coating is directly on the bond coat.

19. The assembly of claim 1, wherein the antioxidant coating does not cover the friction surface of the carbon-carbon composite substrate.

20. The assembly of claim 1, wherein the antioxidant coating does not cover the friction surface of the carbon-carbon composite substrate.

* * * * *